United States Patent [19]
Snyder

[11] 3,888,343
[45] June 10, 1975

[54] LOCKING DEVICE FOR A POSITIONING MEANS OF A CONVEYOR PRESSURE ROLLER

[76] Inventor: Bernard Rex Snyder, 3005 Azalea Ter., P.O. Box 698, Norristown, Pa. 19401

[22] Filed: Aug. 13, 1973

[21] Appl. No.: 388,030

[52] U.S. Cl. ............... 198/127 R; 193/37; 198/208; 226/174; 226/194
[51] Int. Cl. ............................................ B65g 13/02
[58] Field of Search ............ 193/35 B, 37; 198/105, 198/127 R, 208; 226/174, 190, 194

[56] References Cited
UNITED STATES PATENTS

| | | |
|---|---|---|
| 2,827,153 | 3/1958 | Olk et al. .................. 198/127 R |
| 3,180,480 | 4/1965 | Preston ..................... 198/127 R |
| 3,337,022 | 8/1967 | Merry ....................... 198/127 R |

*Primary Examiner*—Evon C. Blunk
*Assistant Examiner*—Jeffrey V. Nase
*Attorney, Agent, or Firm*—William E. Cleaver

[57] ABSTRACT

The present invention provides a threaded stud upon which a positioning cam (for a pressure roller in a live roller conveyor) can be located in various positions and a threaded means to be threaded over said stud in order to be tightened against said cam to hold said cam in a fixed position by friction when said threaded means is tightened against said cam.

3 Claims, 3 Drawing Figures

PATENTED JUN 10 1975  3,888,343

LOCKING DEVICE FOR A POSITIONING MEANS OF A CONVEYOR PRESSURE ROLLER

BACKGROUND

In live roller conveyors it is well known that the speed of the conveyor rollers, i.e., the rollers over which packages or equipment is actually transported, is dependent in good measure upon the pressure of the drive belt against the conveyor rollers. The pressure of the drive belt against the conveyor rollers in turn is determined by the position of the pressure rollers with respect to the drive belt. For instance, if the pressure rollers are moved toward the conveyor rollers the conveyor rollers will be driven more positively.

Since different conveying projects or jobs require different speeds, the pressure rollers are subject to frequent repositioning. In order to accomplish the adjustment it has been the practice to provide cams which are secured to the shafts about which the pressure rollers rotate and these cams have been disposed to come in abutment with a flange on the frame of the machine, or in abutment with a punched out ear, located in proximity to the position of the shaft about which the pressure roller freely rotates. Such an arrangement has had at least two characteristics which are undesirable.

First it should be understood that when a conveyor operates it vibrates in great measure and said vibration tends to cause the cams to creep, thus causing them to seek a new position. Such changes in position of the cam, of course, results in repositioning the pressure rollers and thus changes the pressure of the pressure roller against the drive belt. In addition the rotating pressure rollers tend to rotate the shaft about which they are freely rotating and this in turn acts to move the cam out of the position in which it has been set. In one attempt to keep the cam locked there has been a technique employed whereby a spring has been mounted over the shaft (about which the pressure roller rotates) and the spring lies between the end of the pressure roller and the cam, thereby holding the cam in a secure position. This particular technique necessitates the cam being on the inside of the frame which limits a visual inspection of the cam positions for the various rollers and therefore makes the adjustment of the entire set of pressure rollers in the conveyor somewhat cumbersome.

In addition in the prior art once the flange, or the punched out ear, is located and the adjustment cam has been selected to provide a range of adjustments it is not feasible to readily provide a new range of adjustments for the pressure rollers without providing a new set of cams.

The present invention eliminates the possibility of repositioning the cam in response to vibrations or to the efforts of the pressure rollers to turn the internal shafts. In addition the present invention enables the user to obtain a new range of adjustments by simply increasing the diameter of the stud upon which the cam rests.

SUMMARY

The present invention provides (for each pressure roller) first and second cams, secured to a shaft, about which the pressure roller freely rotates. Actually there is a plurality of shafts and a plurality of pressure rollers employed in a live roller conveyor with which the present invention is used. Each of the cams is disposed to abut a threaded stud which is mounted in the frame of the conveyor. Further, on each stud there is located a flanged nut, or in the alternative, a flat washer type device is held between a nut of the threaded stud and the cam. When the nut is threaded up against the cam (or against the washer) in a tight position, the friction between the cam and the flange of the nut (or between the cam and the washer) keeps the cam from rotating or repositioning.) In addition the threaded stud can be easily replaced by a stud with an increased diameter portion, which lies exterior to the stud holes, so that the cam can be positioned into a new range of locations. The features and objects of the present invention will be better understood when the following description is considered in conjunction with the drawings wherein:

It should be understood that in the diagrams only a very small portion of a live roller conveyor is shown, (i.e., only a few rollers are shown) since the invention deals with the locking device on the cam of a pressure roller rather than with an entire live roller conveyor.

Figure 1:
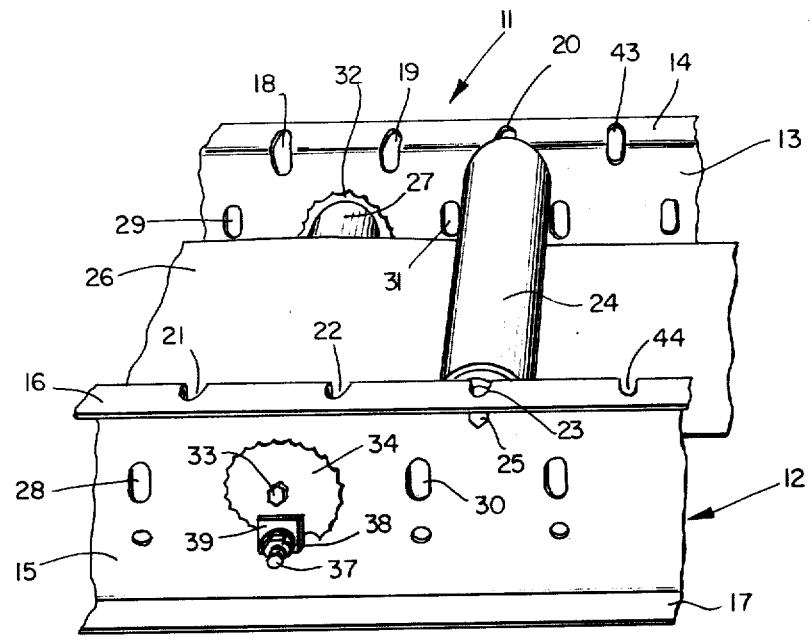
FIG. 1 is a partial pictorial schematic showing one conveyor roller, a drive belt and a pressure roller with the invention employed therewith.

In FIG. 1 there is shown a side plate 11 and a side plate 12 of a live roller conveyor. The side plate 11 has a vertical section 13 as well as an upper ledge 14 which is bent orthogonally or approximately orthogonally to the vertical section 13. Similarly the other side piece 12 has a vertical section 15 and a ledge portion 16 which is bent substantially orthogonally to the vertical section 15. As can be seen in FIG. 1, the side piece 12 has a lower flange section 17 which is also bent outward and approximately orthogonally to the vertical section 15. While it cannot be seen in FIG. 1, it should be understood that the side piece 11 also has a lower flange section which is similar to the flange section 17 of the side piece 12.

It will be noted that in the side piece 11 there are four cut out sections 18, 19, 20 and 43. The cut out sections are cut from the corner where the ledge section 14 meets the vertical section 13. It will be further noted that there are corresponding slots 21, 22, and 23 and 44 cut out from the corner of side piece 12 where the ledge section 16 meets the vertical section 15. As can be seen in FIG. 1, these slots enable a conveyor roller to be simply or easily located therein in the manner in which the conveyor roller 24 is shown mounted in the two slots 20, 23. The conveyor rollers are mounted to freely rotate around a shaft, such as shaft 25, which can be seen under the ledge 16 on the side piece 12 side. The shafts are very often hexagonally formed on the ends so that when they are seated in the slots there is an impedance against the shafts rotating.

Now it should be understood that there will be similar conveyor rollers mounted in the slots 19 and 22, in the slots 18 and 21 and in the slots 43 and 44, so that if the portion of the conveyor shown in FIG. 1 were carrying its full capacity of conveyor rollers there would be at least four such conveyor rollers shown. These conveyor rollers were not included in the drawing in order to enable the other portions of the conveyor to be depicted.

In FIG. 1 there is shown a drive belt 26. The drive belt 26 is motor driven and by friction it rotates a plurality of pressure rollers. One such pressure roller 27 is shown in FIG. 1. The pressure rollers are mounted across the side pieces on shafts, which shafts are located in the pair of holes such as the pair 28 and 29 or the pair 30 and 31.

If we consider the structure related to the pressure roller 27 we note that in abutment with the side piece 11 there is a cam 32, mounted on the inside of the side piece 11. The cam 32 is mounted on the shaft 33 which can be seen extending from the side piece 12. It can be seen in FIG. 1 that the cam 34 is mounted on the outside of the side piece 12 and is also mounted on the shaft 33. If we digress for a moment and examine FIG. 2 where we see the cam 34, we note that the center cut out 35 of the cam 34 is hexagonal and therefore fits snugly over the shaft 33. It should be understood that the cam 32 also has a hexagonal center cut out and fits snugly over the shaft 33. It should be apparent that if the cam 34 is turned to a new position, the shaft 33 will rotate therewith and will also cause the cam 32 to assume the same position as that of cam 34.

Figure 2:
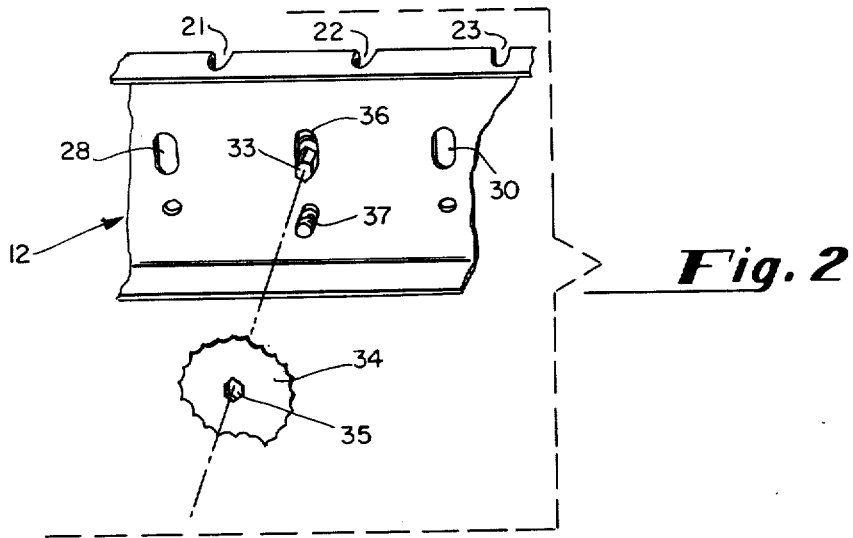
FIG. 2 shows the side plate shown in FIG. 1 with the cam removed so that the threaded stud as well as the internal shaft of the pressure roller can be seen.

Before taking up the matter of the locking device itself, examine FIG. 2 wherein the shaft 33 is shown emerging from the over-sized hole 36 in the side piece 12. Also as can be seen in FIG. 2 there is a threaded stud 37 which is mounted in the side piece 12. The threaded stud can be mounted in many ways and the simplest way is to simply put a bolt and a lock washer on the inside of the side peice 12 to prevent any movement of the stud out of the side piece in response to a nut being threaded thereon.

Now if we return to the examination of FIG. 1, we note that the cam 34 is mounted on the shaft 33 and that threaded on the threaded stud 37 is a threaded nut 38. In the particular embodiment shown in FIG. 1, there is a washer type device 39 mounted, or disposed, between the nut 38 and the cam 34. The washer device 39 actually, in the embodiment shown, is a rectangular shaped piece of material which can be fabricated of metal or rubber or some substantially rigid material which would give a good friction surface, so that when it is held tight against the cam 34 it will keep the cam 34 from repositioning in response to whatever forces may cause the cam to try to reposition. It should be understood that there need not be a washer type device 39 but instead the nut 38 can simply have a flange on the inside or can simply have the nut itself provide the friction surface. However, it can be readily understood that the more the surface which is applied to the cam 34 the more friction force there is that must be overcome, if the cam attempts to creep or assume a new position in response to vibration, etc.

Now if the pressure rollers of the conveyor are to be reset to a new position, the nut 38 is simply loosened and the washer slid away from the cam 34 and the cam 34 is moved to a new position and comes to rest on the stud 37. The cam can readily move the shaft 33 up and down because of the over-sized hole 36 as is shown in FIG. 2. It should be understood that there is a similar stud on the side piece 11 that is located on the inside surface of side piece 11 upon which the cam 32 can come to rest. By employing the present locking technique it is possible to visually observe that all of the cams in the roller conveyor which are used to adjust the pressure rollers are in the same position (or some predetermined positions) because these cams are located on the outside of the side piece 12. When the spring locking mechanism mentioned earlier is employed the cam must be on the inside of the side price and this aid of a visual adjustment is not possible.

Figure 3:
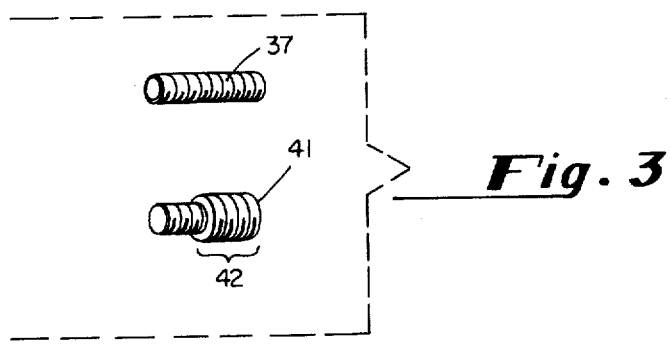
FIG. 3 shows two embodiments of the threaded stud.

Sometimes in roller conveyor systems because of wear on the rollers or wear on the belt or because different types of conveyor rollers are employed for a peculiar or particular kind of a job, it becomes necessary to change the range of normal adjustment of the pressure rollers or change the range of the previously designed pressure rollers. In the prior art systems this would have necessitated change in the cams because the device upon which the cams abutted was fixed, i.e., that is the flange upon which the cams abut in one system or the punched out ear upon which the cams abut in another system, are fixed in their locations and cannot be readily changed to provide a new camming location. In the present system it is a simple matter to change the shape of the stud to provide a new range of cam positions. For instance, if we look at FIG. 3 we will see that the top stud is the stud 37 shown in FIGs. 1 and 2. If the range of the cam adjustment is to be increased, the stud 41 may be employed with the section 42 lying outside of the side piece 12 and inside on the side piece 11. By increasing the diameter as shown by the section 42, the shaft 33 is lifted toward the top of the machine providing more pressure on the drive belt 26 and the other pressure rollers can also exert more pressure.

Accordingly, the present invention provides a number of advances over the prior art. The present inventon enables the pressure rollers to be all adjusted with a visible check. The present invention provides a positive locking scheme on the adjusted cams so that they do not creep to new position and the present invention enables the user to provide a means for a new range of adjustments without having all of the cams replaced.

I claim:

1. A locking device to be used with a means for positioning a conveyor pressure roller which is held supported by first and second side plates comprising in combination threaded stud means formed to have a first portion with a relatively large diameter and a second portion with a relatively small diameter, said threaded stud means disposed so that at least a part of said second portion is located in said first side plate so that said first portion is in abutment with said first side plate but protruding externally therefrom away from said second side plate, said stud means further disposed to be in close proximity to said means for positioning a conveyor pressure roller so that said means for positioning a conveyor pressure roller comes to rest on said first portion of said threaded stud means; securing means having a threaded cylindrical aperture therein and having a relatively large flat surface disposed orthogonally to the axis of said threaded aperture, said threaded aperture having threads formed to match the threads of said threaded stud means for being threaded thereon so that said relatively large flat surface can be held firmly against said means for positioning a conveyor pressure roller in response to said securing means being threaded toward said first side plate to come in abutment with said means for positioning a conveyor pressure roller.

2. A locking device according to claim 1 wherein said securing means comprises a nut having a flange formed therewith to provide said large flat surface.

3. A locking device according to claim 1 wherein said securing means comprises a nut and a washer combination.

* * * * *